United States Patent
Nilsson et al.

(10) Patent No.: US 6,189,052 B1
(45) Date of Patent: Feb. 13, 2001

(54) ON-CHIP I/O PROCESSOR SUPPORTING DIFFERENT PROTOCOLS HAVING ON-CHIP CONTROLLER FOR READING AND SETTING PINS, STARTING TIMERS, AND GENERATING INTERRUPTS AT WELL DEFINED POINTS OF TIME

(75) Inventors: Mikael Nilsson, Lund; Jonas Oxenholt, Åkarp; Kenny Ranerup, Lund; Stefan Sandström, Eslöv, all of (SE)

(73) Assignee: Axis AB, Lund (SE)

( * ) Notice: Under 35 U.S.C. 154(b), the term of this patent shall be extended for 0 days.

(21) Appl. No.: 09/204,212

(22) Filed: Dec. 2, 1998

(30) Foreign Application Priority Data

Dec. 11, 1997 (SE) .................................................. 9704627

(51) Int. Cl.[7] .............................. G06F 13/14; G06F 13/20
(52) U.S. Cl. ................................. 710/48; 710/8; 710/11; 710/36
(58) Field of Search ................................... 710/1, 48, 36, 710/8, 11

(56) References Cited

U.S. PATENT DOCUMENTS

| | | | | |
|---|---|---|---|---|
| 5,423,014 | * | 6/1995 | Hinton et al. ........................ | 395/400 |
| 5,426,759 | * | 6/1995 | Padgaonkar ......................... | 395/425 |
| 5,535,417 | * | 7/1996 | Baji et al. ............................ | 395/842 |

* cited by examiner

Primary Examiner—Thomas C. Lee
Assistant Examiner—Rehana Perveen
(74) Attorney, Agent, or Firm—Cary & Kelly LLP

(57) ABSTRACT

An on-chip i/o-processor for controlling and communication with peripheral devices, wherein an i/o processor core (12), comprising at least one pin controller (29) for reading and setting physical i/o-pins (6), starting timers and generating interrupts for the i/o processor core (12), at least one timer (26) for sampling i/o-pins (6), setting i/o-pins (6) and generating interrupts for the i/o-processor core (12) at well defined points of time, said i/o-processor core (12) providing instructions for controlling said at least one pin controller (29), said at least one timer (26) and i/o-pins (6), an on chip RAM (3) holding instructions for the i/o processor core (12), at least one register (4) for exchanging information between the i/o-processor (2) and a connected CPU (1) on the same chip and inversely, configurable logic (5), connected between said core (12) and said i/o-pins (6), for synchronization of incoming and/or outgoing signals.

9 Claims, 10 Drawing Sheets

ON-CHIP I/O PROCESSOR SUPPORTING DIFFERENT PROTOCOLS HAVING ON-CHIP CONTROLLER FOR READING AND SETTING PINS, STARTING TIMERS, AND GENERATING INTERRUPTS AT WELL DEFINED POINTS OF TIME

PRIORITY CLAIMED

This application claims the benefit of priority to Swedish Application No. 9704627-0, filed Dec. 11, 1997, entitled I/O Processor, which is incorporated by reference as if fully set forth herein.

FIELD OF THE INVENTION

The present invention relates to a design and implementation of an on-chip i/o-processor and more particularly an i/o-processor supporting different protocols.

DESCRIPTION OF THE PRIOR ART

The main function of a computer involves its CPU and main memory. The CPU fetches instruction and data from the main memory, processes them, and stores the results in the main memory. Other important functions of the computer are the i/o operations (input/output operations). These operations are performed by the i/o system, comprising i/o devices or peripherals, control units for the devices, and software to carry out the i/o operations. The purpose of the i/o system is to transfer information between the main memory or the CPU and the i/o devices.

There are different kinds of prior art i/o systems available, all of which systems utilize the CPU to some extent. If i/o operations are completely controlled by the CPU the system is usually called a programmed i/o system. Programmed i/o can be implemented with very little dedicated i/o hardware. However, a programmed i/o system often suffers from spending a great deal of time performing trivial i/o operations.

Other computer systems are provided with DMA (direct memory access). DMA requires some additional hardware, such as a DMA controller. In these systems the CPU is still responsible for initiating block transfers, while the DMA system carries out the transfers without CPU interventions.

In some prior art systems the i/o device or its controller is provided with additional circuits for performing service request, or interrupt, from the CPU. The interrupt capability frees the CPU from polling i/o device status. Contrary to a DMA request, an interrupt causes the CPU to switch programs by saving the state of its current program and "jumping" to an interrupt handling program. When the interrupt is completed the CPU can resume execution of the interrupted program.

A further step towards complete control of i/o operations is obtained by using an i/o-processor. Like a DMA controller, an i/o-processor has direct access to main memory and can interrupt the CPU. However, it can also execute programs directly. These so called i/o-programs can use an instruction set different from that of the CPU.

In prior art i/o systems the CPU and its memory are connected to channels or i/o-processors. Each i/o-processor can accommodate a number of peripheral device controllers, each controller controlling one or more identical, or similar, devices such as line printers, laser printers, disks, CD-ROM disks etc.

SUMMARY OF THE INVENTION

The present invention is directed to an improved input-output control system, supporting different protocols. This is accomplished by providing a multi protocol supporting i/o-processor according to claim 1.

It is an object of the present invention to provide an i/o-processor, which replaces a number of dedicated i/o controllers.

Further, it is an object of the invention to provide an i/o-processor compatible with different CPUs.

Another object of the invention is to provide a flexible i/o-processor with the ability to change i/o protocol without any hardware re-design.

Still another object of the invention is to provide an i/o-processor providing shared pin for different protocols.

Another further object of the invention is to provide an i/o-processor enabling a very short design time for a new protocol.

It is also an object of the invention to provide a simple i/o-processor running at a high clock frequency.

Further, it is an object of the present invention to provide a very flexible interface from the i/o-processor to the pins on the chip, i.e. the pins should not have a fixed dedication to a specific protocol.

Thus, an advantage of the processor based implementation according to the invention is that the processor design is much more re-usable and allows for short design time for a new protocol.

BRIEF DESCRIPTION OF THE DRAWINGS

In order to explain the invention in more detail and the advantages and features of the invention a preferred embodiment will be described in detail below, reference being made to the accompanying drawings, in which.

DETAILED DESCRIPTION OF THE INVENTION

Figure 1:
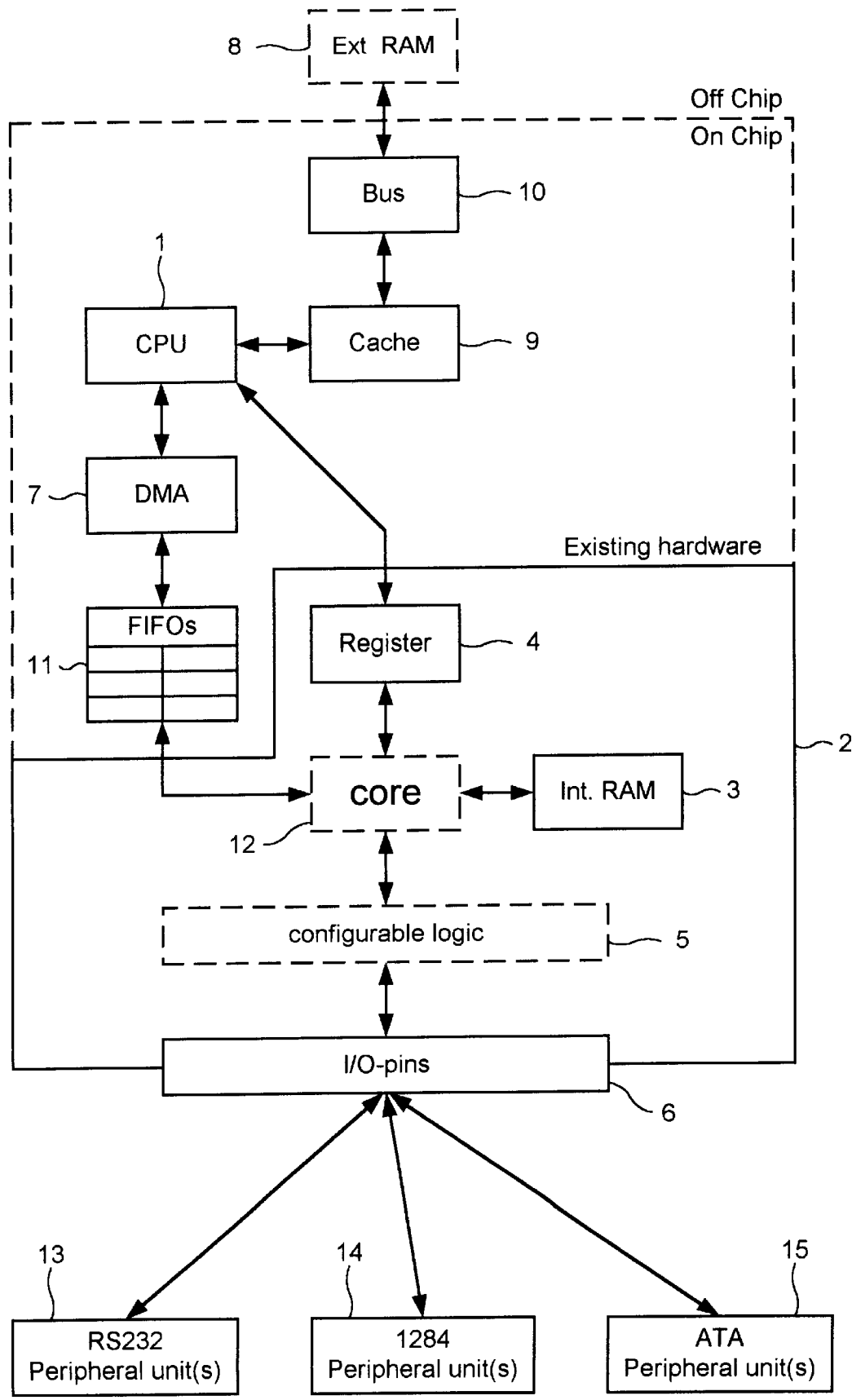
FIG. 1 is a schematical block diagram of an example of a system environment comprising an i/o-processor according to the present invention.

An example of a system overview comprising an i/o-processor according to the present invention is shown in FIG. 1. A CPU 1 is assisted by an i/o-processor 2 according to the invention and together they form a flexible chip with the ability to change i/o-protocol without any hardware re-design. The i/o-processor program code must be stored internal (on-chip) in for example a RAM 3, to maintain speed. A register 4 is used for sharing information between the CPU 1 and the i/o-processor 2. A configurable logic 5 takes care of synchronization of incoming signals and makes it possible to share i/o-pins 6 between different protocols.

The system in FIG. 1 is also provided with a DMA (direct memory access) controller 7, for carrying out block transfer to/from an external RAM 8 without CPU interventions.

In this embodiment the CPU 1 is connected to the external RAM 8 via a cache memory 9 and a bus 10. A set of FIFOs 11 forms an interface between the i/o-processor 2, or its i/o processor core 12, and the CPU 1.

The performance and size of silicon is increasing faster than the development of different i/o-protocols (e.g. RS-232, SCSI, Ethernet, etc). This suggests that it now would be possible to use processor based solutions even for protocols that traditionally are built as hard custom modules.

One embodiment of an i/o-processor 2 according to the invention provides support for RS-232 protocol, IEEE-1284 protocol 14, and ATA protocol 15.

RS-232 is the standard for the electrical serial interface between Data Terminal Equipment (DTE) and Data Connect Equipment (DCE). The DCE is typically a modem and the DTE a PC. RS-232 can be used both for synchronous (X25 and HDLC) and asynchronous serial communications.

The RS-232 electrical interface consists of an 25-pin "RS-23211 connector. All signals are not needed and therefore the PC/AT uses a 9-pin serial port instead of the 25-pin as the RS-232 interface.

The RS-232 interface can work in synchronous mode if additional signals are used. An SCT, Serial Clock Transmit, signal indicates the center of each bit transmitted by the terminal. The DCE samples data on each negative flank of this signal. An SCR, Serial Clock Received, signal is the corresponding timing signal from the DCE.

The most usual way to transfer data in the RS-232 protocol is in the asynchronous mode. In this mode each byte is preceded by a start bit and followed by a stop bit. If parity is used the last data bit is used as parity bit. Parity may be chosen to be even or odd.

The data speed between modem and terminal must be set to a specific value, for example 9600 bps. This would give a data transfer rate of 960 byte/s if no parity is used since each byte consists of ten bits. If parity is used the transfer rate decreases to 840 bytes/s since each 10-bit sequence now only contains 7 data bits. When the receiver detects a start bit, it starts an internal counter and depending on the selected transfer speed it tries to sample the data bits in the center of each bit. The sampling points must not be exactly in the center of each bit, but the total drift at the last bit should not exceed 10% of one bit length. At a transfer speed of 9600 bps each bit length is about 104 $\mu$s. Hence the sampling of the stop bit should occur at 884±10 $\mu$s after the start bit was sent. Higher transfer rates requires higher precision and at 1 Mbps the precision of the last sample should be ±100 ns. At a clocking frequency of 100 Mhz 1 Mbps would correspond to 10 cycles of total drift of the sampling system and a bit length of 100 cycles. Corresponding values are valid for the transmitter. The last bit sent must not drift more than 10% of the length of one bit.

The IEEE-1284 protocol is an asynchronous bidirectional parallel communication protocol often used for connections between a terminal and printers or other peripherals. The interface follows the IEEE-1284 standard which supports five different communication modes. The compatibility mode provides host-to-peripheral communication in a manner compatible with the commonly used unidirectional Centronics interface. The nibble and byte modes provide peripheral-to-host communication and may be combined with the compatibility mode to form a bidirectional operation. In nibble mode data is sent as two sequential nibbles on the status lines. The ECP and EPP modes provide symmetric and asymmetric bidirectional communication, respectively, between host and peripheral.

The 1284 electrical interface consists of a 25-pin D-shell connector, IEEE 1284-A connector. The PC compatible connector is known as the classic 36-pin D-shell Centronics interface, e.g. IEEE-1284-B connector. The IEEE-1284-C connector is a higher density 36-pin connector. There are 19 different interface status/data signals, not shown. Some of these signals are mentioned by its standard name in the following description.

The IEEE-1284 protocol allows bidirectional data to be transferred between a host and peripheral unit. Each transfer mode consists of several states. When data is transferred from host to peripheral unit the interface is said to be in Forward Phase. When data is transferred the other direction the interface is in Reverse Phase. When the mode is to be changed the interface is in its negotiation phase.

The interface may be in both Forward Idle and Reverse Idle Phases waiting for a data transfer to be initiated. The host drives the eight data lines and then pulses nStrobe low. The peripheral responds by setting busy high. When ready for the next byte, the peripheral pulses nAck low and then sets busy low. A transfer rate of 10 Mb/s corresponds to a data transfer cycle time of 100 ns. At 100 MHz clocking frequency this means 10 cycles for each data transfer.

ATA, Advanced Technology Attachment, is the official name for the IDE, Integrated Disk Electronics, interface. ATA was initially used as the hard disk controller for the IBM AT computer, but soon other manufacturers followed IBM and started to use this standard in their own products. The first ATA standard was defined in 1994 and is known as the ANSI X3.T9.2 standard. This defined a 16-bit interface standard to be used with hard disk drives. The standard supports two hard disks on each cable. The standard has two different data transfer modes, via programmed i/o (PIO) or direct memory access (DMA). Later the ATA-2, ATA-3 and ATA-4 standards were defined. The official ATA standard is followed by several popular names like Fast ATA, Ultra-ATA, ATAPI, IDE and EIDE.

The EIDE interface is not a formal ATA standard but defines a set of extensions to the original ATA standard. Maximum data transfer rate of EIDE is 13.3 Mb/s. The newest ATA standard is the ATA-4 standard which includes the presently widely used Ultra-DMA data transfer protocol and the ATAPI (ATA Packet Interface) CD-ROM interface.

The ATA-3 electrical interface consists of a 40-pin connector plus an additional 4-pin DC power connector. The standard defines 31 interface status/data signals.

An ATA DMA transfer is always preceded by a sequence of PIO writes in the hard disk drive's 8-bit special registers. This is done in order to set up the following DMA transfer. When the drive is ready for a DMA transfer it asserts the DMARQ signal.

The host answers by asserting DMACK and DIOR for a DMA read or DIOW for a DMA write. Data is latched on each falling edge of DIOR/DIOW and should be valid in a well defined time interval. A DMA transfer is ended by the peripheral by negating DMARQ before the host negates DIOR/DIOW during the last transfer. The ATA cycle time is define as the time between two falling edges of DIOR/DIOW. ATA-3 mode 2 supports a cycle time of 120 ns. The Ultra-ATA protocol differs from the standard ATA DMA transfer in such a way that the drive is allowed to control a transfer. This is done by adding four control signals to the interface: HDMARDY Host DMA Ready; HSTROBE Host Strobe; DDMARDY Device DMA Ready; DSTROBE Device Strobe.

In traditional ATA the host controls the data strobe signaling (DIOR/DIOW). In Ultra-ATA the hard disk drive controls the data strobe (DSTROBE) during a DMA read burst while the host controls the data strobe (HSTROBE) during a DMA write burst. This allows higher transfer speeds. Data is latched on both rising and falling edge of the strobe signal which doubles the data transfer speed compared to traditional ATA DMA transfers.

The minimum cycle time in Ultra-ATA is specified to 55 ns (mode 2). In a 100 MHz system this would correspond to 5.5 clock cycles.

An i/o processor according to the invention should be re-programmable to any general i/o protocol. The protocols described herein are only examples. The design goal for RS-232 is four independent 1 Mbit/s channels. This would require eight independent processes since each channel consists of one transmitter and one receiver. The timing of the signals has to be quite exact at higher transfer speeds. There have to be ways to create pulses of a specific length and ways to sample a signal at a specific time. Further there has to be some kind of UART (Universal Asynchronous Receiver Transmitter) circuit to convert serial to parallel data and vice versa.

The IEEE-1284 protocol uses an 8-bit bus, wherein a bus architecture is used to reach a transfer speed of 10 Mb/s. The communication is bi-directional and therefore the data bus should also be bi-directional. The existence of different modes and multiple mode changes requires some sort of commands between the main system (CPU) and the i/o processor.

The ATA protocol has a cycle time around 60 ns and a high clocking frequency of the i/o system would facilitate the implementation of ATA support.

The use of a 16-bit bidirectional data line requires a 16-bit i/o bus. To increase performance of the whole system, additional functions like auto address increment to speed up PIO transfers would be nice. In other protocols, such as in the SCSI protocol, some data transfers are very time critical. When data is transferred in synchronous mode from the peripheral unit, a strobe is signaling that data is valid and should be latched. The data is only valid a short time and the i/o processor must therefore immediately enter the right state to latch data no matter what processes are running in parallel. SCSI is built around different phases and the interface is often listening to a combination of two or more signals. This is solved by some kind of bus architecture but it would be even better to allow the design to check or wait for different combinations of signals.

In the following description, numerous specific details, such as address sizes, bus width, number of steps in the method, etc, are provided in detail in order to give more thorough description of the present invention. It will be obvious for those skilled in the art that the present invention may be practiced without these specific details. Some well-known features are not described in detail so as not to make the present invention unclear.

Figure 2:
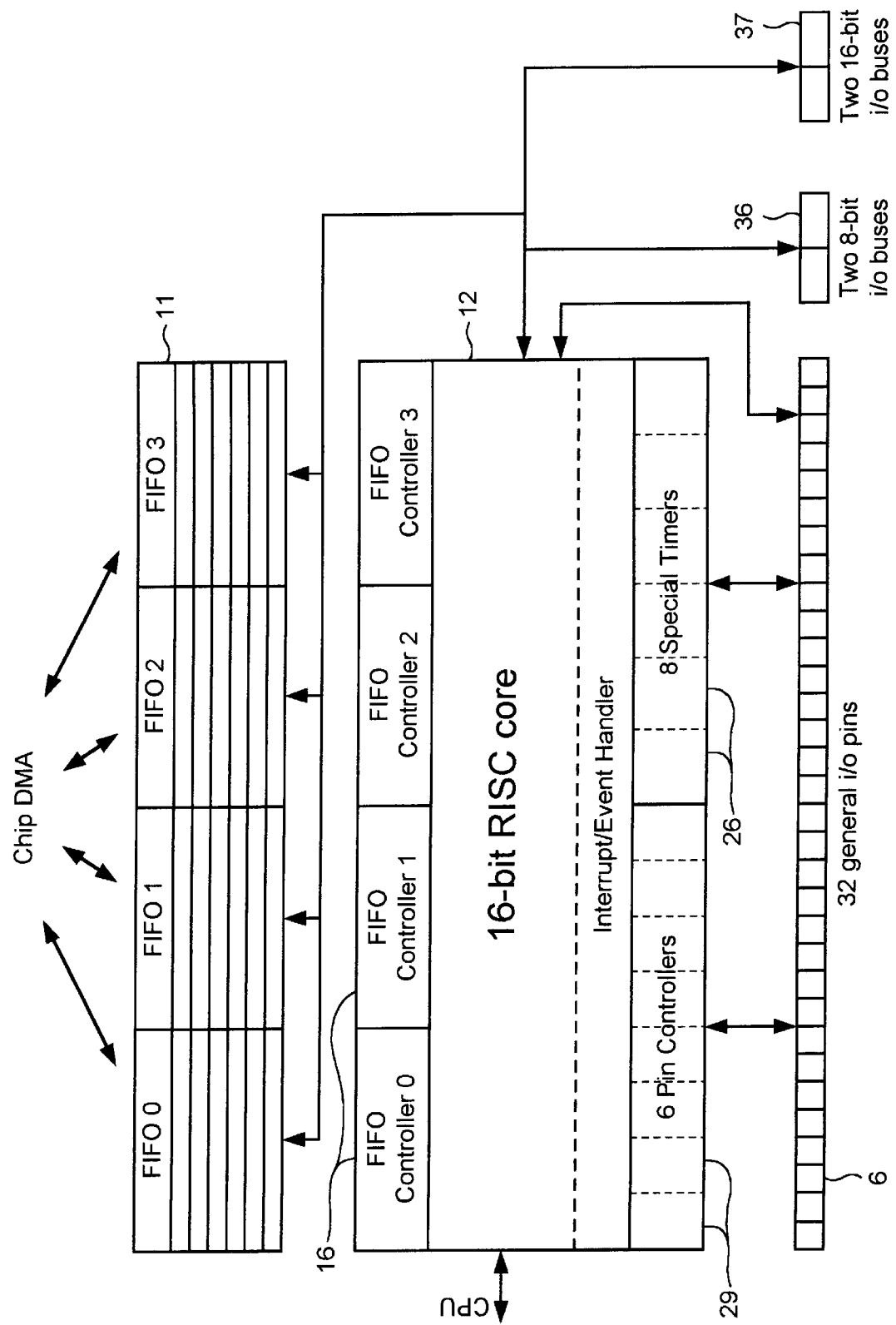
FIG. 2 is a schematical block diagram of an embodiment of the i/o-processor in FIG. 1.

FIG. 2 shows a schematical block diagram of the architecture of an embodiment of the i/o-processor and its i/o processor core 12 in FIG. 1.

The core 12 is provided with four FIFO Controllers 16 used to handle the FIFOs 11. The FIFO Controllers 16 update FIFO Status registers. They also read and write data blocks, where one block can be 8, 16, 24 or 32 bits. To make it possible to check if there are more than a certain number of blocks to read or enough room for a certain number to write, it also contains two registers. One of these registers is used to store a value to which the number of free blocks is compared. This is continuously done and the result is displayed in the FIFO status registers gt_free bit (value greater than free). The other register is used to store a value to which the numbers of available blocks to read is compared. The result from this comparison is displayed in an lt-avail bit (value less than avail). The instructions to these functions are shown in Table 1.

TABLE 1

| Instruction | Description |
| --- | --- |
| LFF (Load value to FIFO Free, greater than) | Load the value that is compared to (greater than) the number of free block in the FIFO |
| LFA (Load value to FIFO Avail, less than) | Load the value that is compared to (less than) the number of available block in the FIFO |

The i/o-processor core 12 is a 16-bit RISC construction. The core 12 is built as a pipelined processor with 2 steps, described later. The number of pipeline steps is a compromise between the clock speed and the number of clock cycles for one instruction to be finished.

Figure 3:
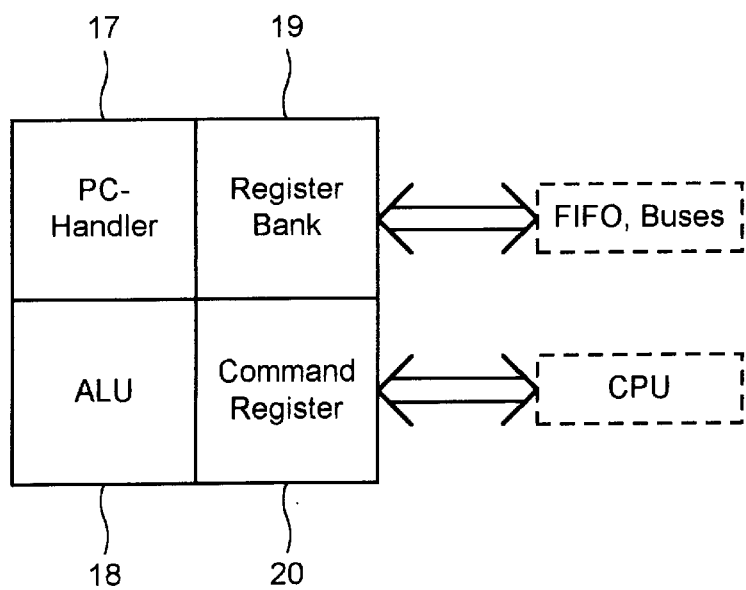
FIG. 3 is a schematical block diagram of an i/o processor core according to the invention.

FIG. 3 is a schematical block diagram of the i/o-processor core according to the invention. A PC-Handler 17 (PC=Program Counter) is used to manage all the interrupts and events. It also takes care of the branch instructions. All addresses for the interrupt and event routines are stored in the PC-Handler 17. These addresses are set by the instructions LIR (Load Interrupt Register) and the LER (Load Event Register). All addresses in the i/o-processor core 12 are 11 bits wide; this allows 2k on chip instruction memory. This is sufficient to implement at least the described protocols 13, 14, and 15.

To enable conditional branches the i/o-processor core 12 has two flags: one ordinary zero flag (Z-flag) and one extended flag (X-flag). The Z-flag is set by an ALU 18 (Arithmetic and Logic Unit) if the result is equal to zero. The X-flag is set by the ALU shift instruction but is also set when sensing a general i/o pin and when a timer buffer is read. Table 2 describes the 5 branch instructions. It is to be noticed that due to the pipeline all branch instructions have one delay slot. This delay slot (the instruction after the branch instruction) is always performed and should (if possible) be used.

TABLE 2

| Branch instruction | Description |
| --- | --- |
| BRA (BRanch Always) | Branch always, not conditional |
| BEQ (Branch if EQual) | Branch if Z-flag = 1 |
| BNE (Branch if Not Equal) | Branch if Z-flag = 0 |
| BXE (Branch if X-flag Equal) | Branch if X-flag = 0 |
| BXN (Branch if X-flag Not Equal) | Branch if X-flag = 1 |

The PC-Handler 17 also has three more instructions:

1. The RTI (ReTurn from Interrupt) instruction which is used at the end of an interrupt routine. This restores the PC to the return address; it also restores the Z and X-flag.

2. The CRA (Change Return Address) which allows the user to change interrupt return address, which is useful when an interrupt indicates that something wrong has occurred.

3. The WTE (WaiT for Event) instruction which "pauses" the processor until an event or interrupt occurs. Notice that it is not recommended to use a WTE instruction inside an interrupt routine.

A register bank 19 in the i/o-processor core contains 10 general 16-bit wide registers. Since many protocols only use 8 bits (1 byte) the registers can be split so that one 16 bit register could be used as 2 8 bit registers. This is done in the ALU 18 with the SWP (SWaP) instruction, which swaps the upper 8 and lower 8 bits. All ALU instructions can then be performed either at byte (lower 8 bits) or at word (all 16 bits). The register bank 19 also handles the data into the ALU 18. Data into the ALU 18 could either be from the register bank 19 or from one of the following sources:

Instruction code, immediate data, LRI (Load Register with Immediate);

FIFO Data, F2R (FIFO to Register) and R2F (Register to FIFO);

FIFO_Status, Each FIFO_Controller has a 16 bit wide status register that can be both written (SFS, Set FIFO Status) and read (CFS, Check FIFO Status);

Bus data, B2R (Bus to Register) and R2B (Register to Bus);

Command register 20, the register towards the CPU. Read with CCR (Check Command Register) and write with SCR (Set Command Register); and Pin register, a register with 14 pins, used check/sense several pins at the same time.

The Command register 20, 16 bit, is used to exchange commands between the CPU 1 and the i/o processor 2 and inversely. This register is in fact two registers, one in which the CPU writes and one in which the i/o processor 2 can write. When the CPU Command Register is changed (e.g. when the CPU gives a command) an interrupt is generated to the i/o processor 2. An example of a command is the baud rate when a RS-232 channel is set up.

The ALU 18 (Arithmetic and Logic Unit) has the most common ALU instructions. As described above, about the register bank 19, the ALU 18 can operate both on byte (8 bits) and on word (16 bits). The Z-flag is set if the result is equal to zero. All ALU operations can be found in Table 3

TABLE 3

| Instruction | Description |
| --- | --- |
| INC (INCrease) | Increases with 1 |
| DEC (DECrease) | Decreases with 1 |
| CMP (CoMPare) | Sets Z-flag if equal |
| AND | Ordinary AND |
| OR | Ordinary OR |
| NOT | Ordinary NOT |
| ROR (ROtate Right) | Shifts in the X-flag from left. The outshifted bit is put in the X-flag |
| SWP (SwaP) | Swaps the upper 8 bits with the lower 8 bits |
| MOV (MOVe) | Copies one register |

The i/o-processor architecture is built around 16 interrupts and 4 events. There are several ways of generating interrupts and events, see Table 4.

TABLE 4

| Source | Interrupt | Event |
| --- | --- | --- |
| Timer | Yes, every lap | Yes, every lap |
| Controller | Yes | Yes |
| Instr. code | Yes | No |
| Several pins = bit pattern | No | Yes |

All interrupts and events have their own programmable instruction addresses, e.g. subroutine addresses. Because there are no queuing of interrupts or events, the signaling unit must keep signaling until it receives an acknowledgment. Queuing of signals should not be essential since the routines performed often are very short (4–5 instructions). Instead, priority is used to choose among interrupts or events. Interrupt 0 has the highest priority 15 has the lowest. Events work at a lower priority than all interrupts.

When an interrupt occurs the flags and return addresses are stored and the executions continue at the corresponding interrupt address. Inside the interrupt routine, it is possible to change the return address if wanted; this is useful if an error occurs and it is necessary to abort and start over again.

If an event occurs the execution continues at the corresponding event address. The events has no return address and do not store the flags. Events are not activated until the processor is in wait mode, using the WTE (Wait Event) instruction.

The events are supposed to be used together with interrupts with very high priority which must not be locked out by non critical events. Less important signaling should be handled by the event handler which will allow important interrupts to be handled immediately. A good example is protocols where the peripheral unit drives a request signal high to indicate that data is valid and may be latched in. If this is a very fast protocol (i.e. time critical) the i/o-processor 2 must immediately enter the proper interrupt and read the data bus.

The interrupt routine addresses are stored in 16 11-bits interrupt registers. These are loaded by the LIR (Load Interrupt Register) instruction. The interrupt source and priority order are shown in Table 5. Interrupt 13 is a special interrupt, and it is activated by the instruction code INT. The use of this interrupt can for example be if you want to take advantage of the fact that the i/o processor does not allow interrupts in interrupts. Thus, if a very time critical operation is to be performed the INT instruction can be used to go into an interrupt routine and do the work there.

TABLE 5

| Priority, 0 = highest | Source |
| --- | --- |
| 0 | Timer 0 |
| 1 | Controller 0 |
| 2 | Timer 1 |
| 3 | Controller 0 |
| 4 | Timer 2 |
| 5 | Controller 2 |
| 6 | Timer 3 |
| 7 | Controller 3 |
| 8 | Timer 4 |
| 9 | Controller 4 |
| 10 | Timer 5 |
| 11 | Controller 5 |
| 12 | Timer 6 |
| 13 | INT (Instruction Code) |
| 14 | Timer 7 |
| 15 | CPU |

Figure 4:
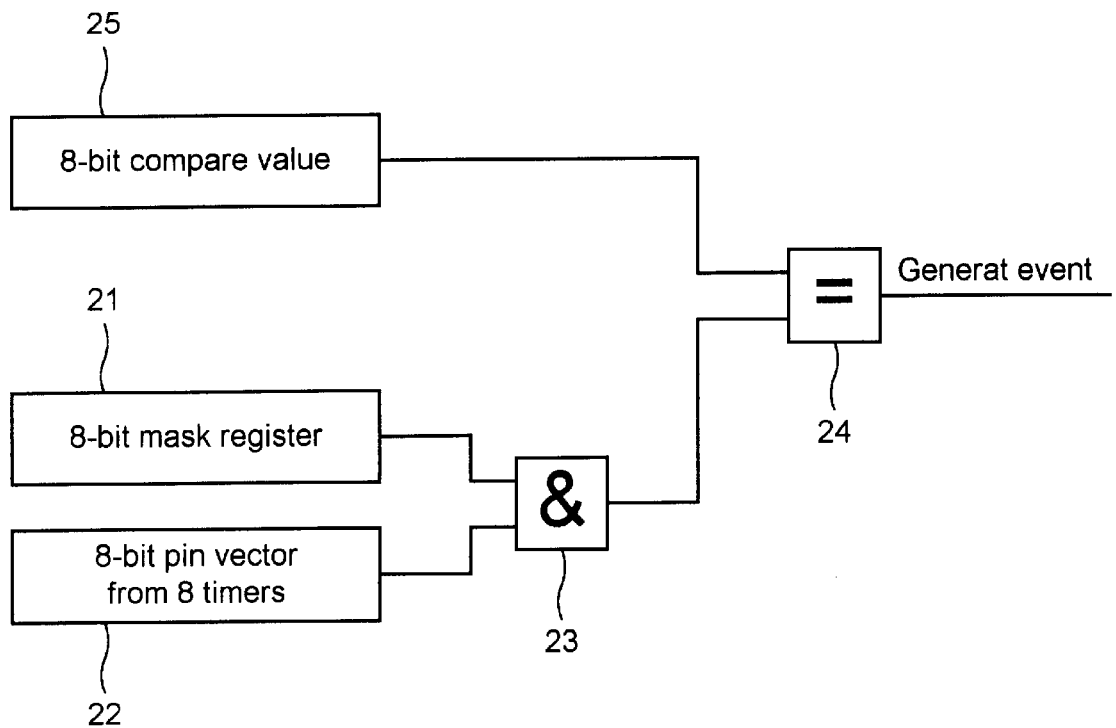
FIG. 4 is a schematical view of an arrangement for pin mask combination used for some protocols.

The four event addresses are stored in four 11-bits event registers. These are loaded by the LER (Load Event Register) instruction. The four events may be selected from 6 controllers, 7 timers or two pin masks by the LES (Load Event Select) instruction. As with the interrupts it is event-0 that has the highest priority As shown in FIG. 4, the i/o-processor 2 has two 8-bit pin mask registers 21, and these registers are used together with the timer's pin select registers 22. The mask registers 21 are used to select a combination of pins, by means of an AND-gate 23, which are compared, by means of a comparison component 24, with two 8-bit pin mask compare registers 25. This solution makes it possible to wait for a combination of several signals and then generate an event. This feature is not needed in the three basic protocols 13, 14, and 15, but in other protocols (i.e. SCSI) it is very useful.

Figure 5:
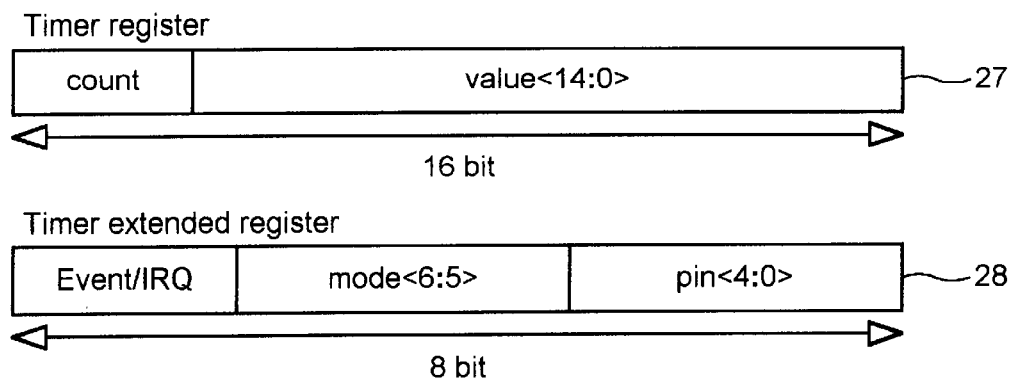
FIG. 5 is a schematical view of timer registers.

The i/o-processor architecture contains 8 special 15-bit timers 26, shown in FIG. 2. The value of the timer 26 is stored in a 16 bit register 27 (Timer register), shown in FIG. 5, wherein the 16:th bit is used to indicate whether the timer 26 is active or inactive. A timer counts continuously, until it is stopped, and generates an interrupt or event every round. It is allowed to change a timer's register value during a count; in the next round the new value will be loaded into the timer. A timer can be started by a controller or from the instruction code.

Figure 6:
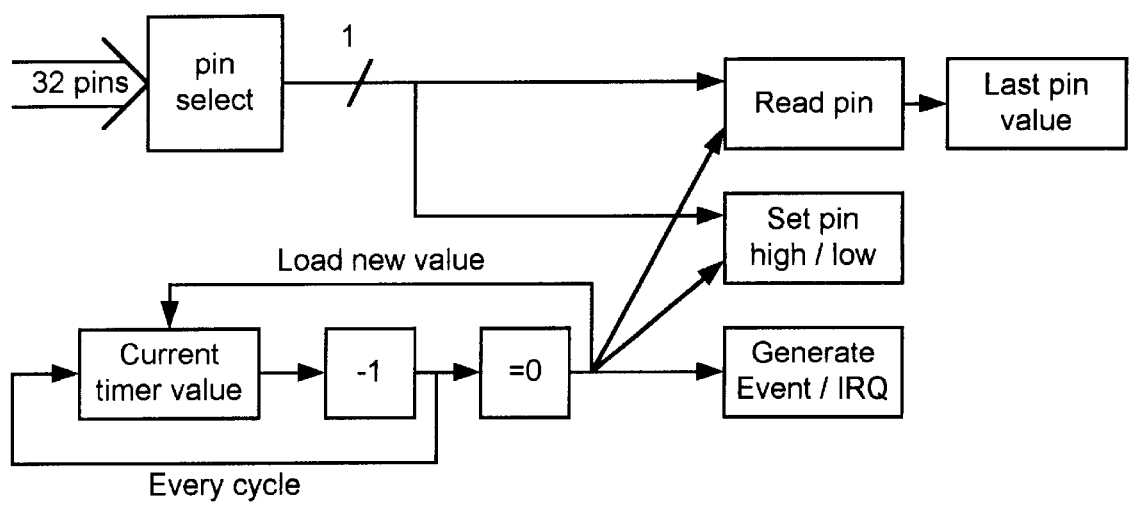
FIG. 6 is a functional view of an i/o-processor timer.

A second register, an 8 bit wide Timer extended register 28, is used for the timers special functions. With this register it is possible to perform different features at every counted lap. The msb in this register is used to select if an event (msb=1) or an interrupt (msb=0) will be generated. There are 4 modes for each timer, see Table 6; the different modes are selected in the timer extended register 28. A functional view of a timer is illustrated in FIG. 6.

TABLE 6

| Mode | Behavior of timer, besides generating IRQ or event |
| --- | --- |
| 0 | None, ordinary timer |
| 1 | Samples a pin value and stores its value for later use |
| 2 | Sets the selected pin low |
| 3 | Sets the selected pin high |

An example of both the timers and controllers is described later.

Figure 7:
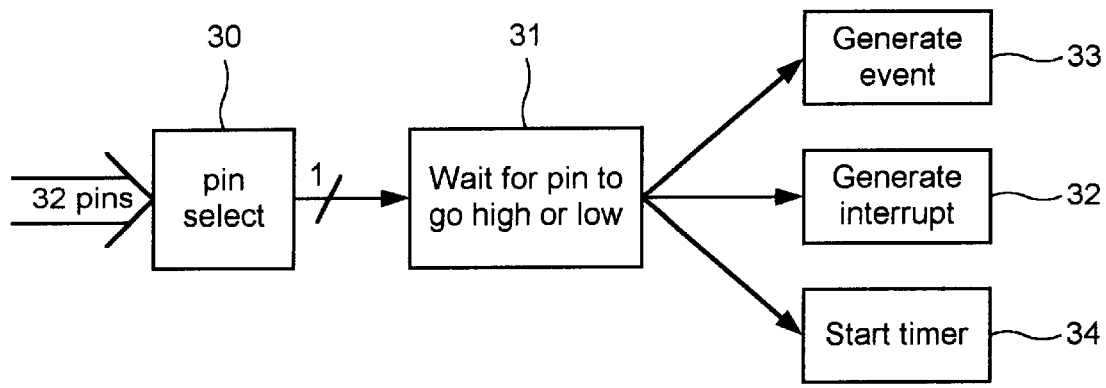
FIG. 7 shows a principle of a controller of the invention.
Figure 8:
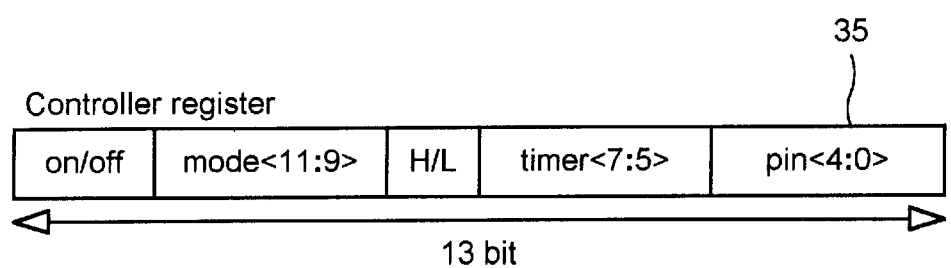
FIG. 8 shows a controller register.

The i/o-processor architecture also contains 6 specialized pin controllers 29, shown in FIG. 2. A controller continuously senses one of 32 pins in a pin selector for high or low. If the selected pin goes high or low, checked in a wait circuit 31, the controller 29 generates an interrupt 32 and/or event 33. The controller 29 also can start an i/o-processor timer 34. A controller stops iteself when the programmed state is fulfilled. FIG. 7 shows the principle of a controller.

The behavior of the controllers is set in its bit controller register 35. The difference modes are described in Table 7.

TABLE 7

| Mode | Behavior |
| --- | --- |
| 0 | No effect (not used) |
| 1 | Start timer (no IRQ) |
| 2 | Generate IRQ |
| 3 | Start time + Generate IRQ |
| 4 | Generate Event |
| 5 | Start timer + Generate Event |

TABLE 7-continued

| Mode | Behavior |
| --- | --- |
| 6 | Generate Event + Generate IRQ |
| 7 | Generate Event + Start timer + Generate IRQ |

Configurable logic takes care of the synchronization of incoming signals and makes it possible to share pins between different protocols. The logic works as an interface between the RISC core and the physical pins. But how should this configurable logic be designed? A first approach would be to make the connections as flexible as possible. This means that each pin can be defined as a general i/o pin. To increase speed at bus operations such as a write operation to the ATA data pins, some sort of bus should be defined. An ideal solution would be to have the ability to configure any pin to belong to a bus in no special order. This would unfortunately demand unrealistically large registers and multiplexors to build. Defining four 16-bits i/o buses on a chip with 128 i/o pins would take up to 1500 memory elements (e.g. flip flops) plus large multiplexors.

A more realistic solution could be to have a number of pre-defined buses that makes r/w from several pins in parallel possible. These would be connected to pre-defined pins. Beside the buses there are a number of general i/o pins ready to be used for handshaking and/or single data lines. The logic may release a whole bus or a single i/o pin which will result in a tristate mode and make inputs possible.

The i/o-processor 2 has 32 general i/o pins, two 8-bit buses 36 and two 16-bit buses 37. All pins and buses can be tristated (to enable input) with the instructions TRP (TRistate Pin) and TRB (TRistate Bus). To configure a pin or bus for output the instructions NTP (Not Tristate Pin) and NTB (Not Tristate Bus) are used.

Figure 9:
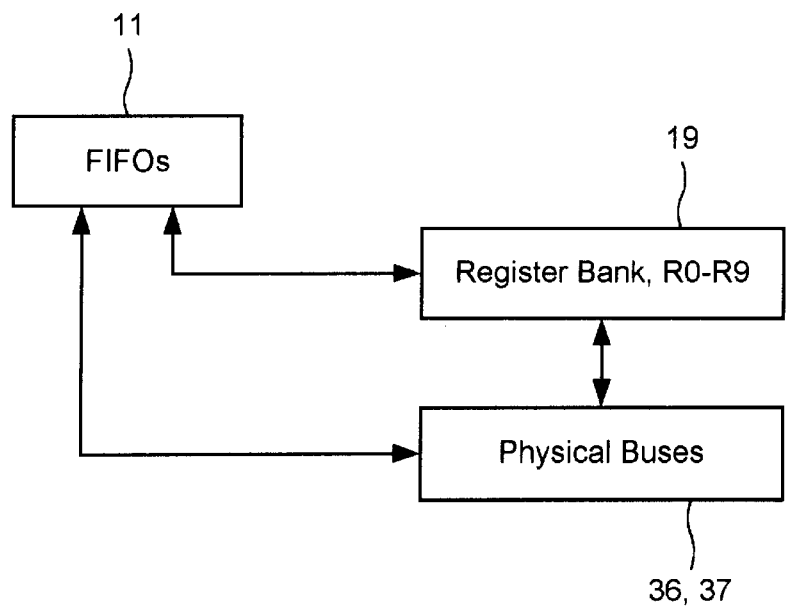
FIG. 9 shows data transfer paths of the i/o-processor.
Figure 10:
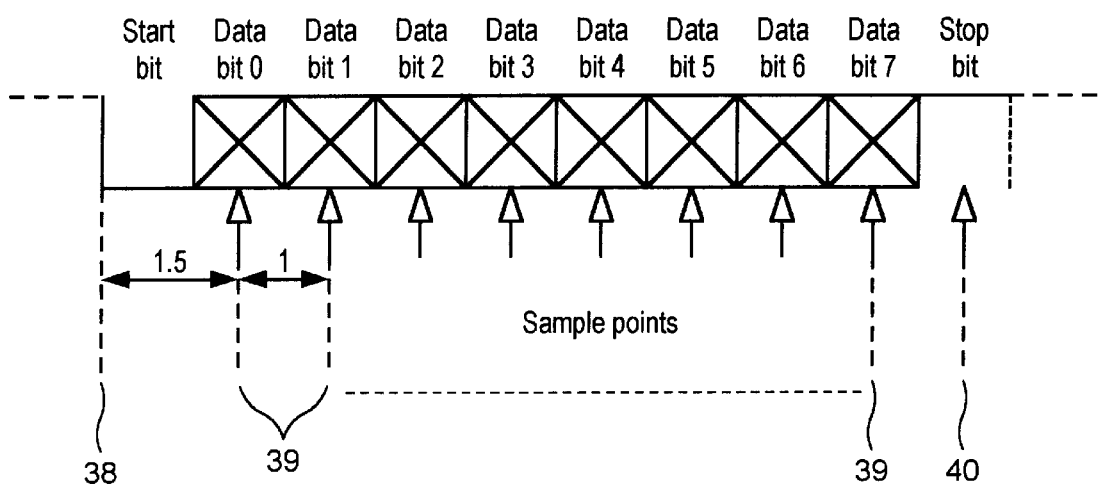
FIG. 10 shows an RS-232 RxD signal.

To enable fast data transfer between the buses 36, 37 and the FIFOs 11 the i/o-processor architecture allows direct transfers, as shown in FIG. 9. The instructions used are B2F (Bus to FIFO) and F2B (FIFO to Bus). It is also possible to modify data by leading the data through the Register Bank 19, as described above.

Some protocol problems are described and a solution of the problems is presented. The program that describes the protocol is written with assembler instructions. The i/o-processor assembler then converts this ordinary text file to a binary file. The i/o-processor assembler is able to handle labels to make it easier to write programs. In the following sections a number of different problems are solved and discussed.

In this section a problem is solved with controllers and timers, showing the advantage of these blocks. The example we will follow is a part of the receiving procedure of RS-232. Please remember that our design goal was 4 bidirectional RS-232 channels at the same time.

Problem: When receiving RS-232 you wait for a start bit 38 to come, after the start bit you have to sample each data bit 39 in the middle of the bit. Finally a stop bit should be detected 40. The last data bit (#7) could be used as a parity bit, but in this small example we do not show how to implement a parity check.

Method: Load (do not start) a timer, the timers value shall be set to the number of i/o processor cycles equal to 1.5 RS-232 bits. The timer also shall be set to sample the RS-232, RxD signal. The sampled value of the RxD signal is stored in a special 1 bit wide register, which can be read in the interrupt routine.

Then use an i/o-processor controller to sense for the start bit 38; the controller will start the timer and generate an interrupt. In the interrupt routine we setup a free register to store the byte being received. In the same interrupt routine we load the timer with the value equal to the length of one RS-232 bit. The timer now samples all data bits 39 exactly at the right time. In the timer interrupt routine we take care of the sampled bit 39 and increment a counter to decide if 8 data bits 39 have been received. Because the timer self samples the data bit the time for the interrupt is not critical. When all 8 bits are received the timer should sample the stop bit 40 and then stop. In the last interrupt routine the received byte can be put in the FIFO 11 to the CPU 1. This routine also reloads the timer value (with 1.5) and starts the controller to sense for another start bit, indicating another byte to be received.

In this section a problem is solved with events. The example we will follow is a negotiation from Compatibility mode to Nibble mode in the IEEE-1284 protocol.

Figure 11:
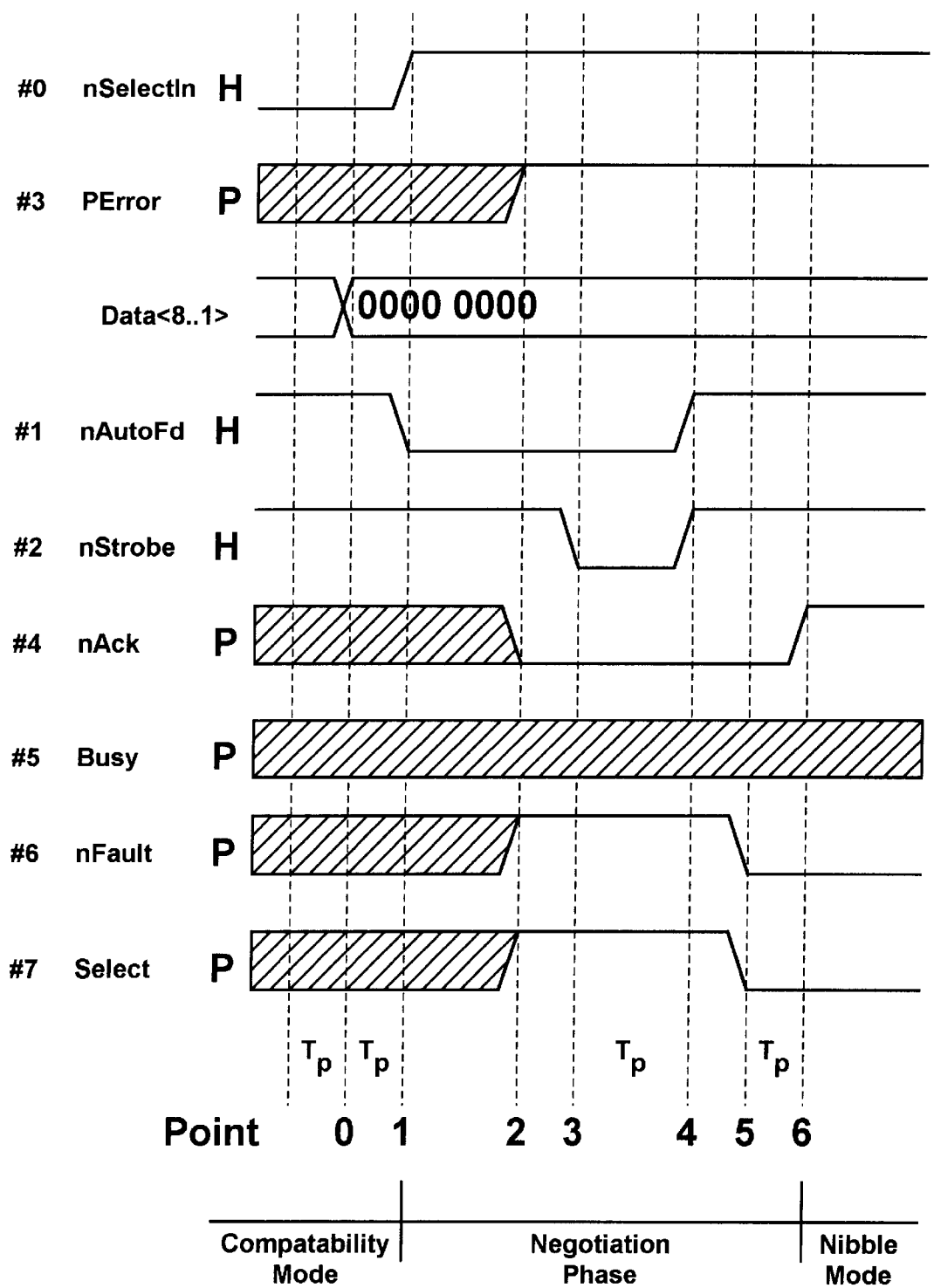
FIG. 11 is a timing diagram for the IEEE-1284 Negotiation Phase.

Example: The difficulty when communicating in IEEE-1284 is the large number of pins (8) used when handshaking. This example strictly follows the timing diagram shown in FIG. 11. The number standing to the left of the pin name is the pin number. The letter H and P indicates if the signal is Host or Peripheral driven. In this example the AJAX is working as a Host. Finally the Tp is the minimum pulse for this protocol, this time is 500 ns. If we assume that the i/o-processor is clocked at 200 MHz this is equal to 100 clock-cycles. Notice that the numbers at the bottom line indicate the different timing points.

Method: Put 0000 0000 at the data bus (bus 0) (point 0), then load a timer to wait for Tp seconds. Then set nSelectin high and nAutoFd low (point 1); these signals are a request to the peripheral if it is an IEEE-1284 compatible unit.

Start sensing the pins PError, nAck, nFault and Select for the response signature for IEEE-1284. At this point we also have to start a timer to count for a time-out if the peripheral does not respond. The maximum response time in IEEE-1284 is 35 ms (equals 7.000.000 i/o-processor cycles) but in this example we just set the timer to wait for 7000 cycles (equals 35 μs).

If the peripheral responses correctly (point 2), we 30 pulse the nStrobe signal (point 3,4). We also stop the timer counting for time-out.

Wait for nAck to go high (point 6), indicating that the peripheral has accepted the requested mode.

The i/o-processor is mainly implemented in a 1-phase clocking system, but area consuming register banks have been implemented as latches in a 2-phase system. The whole design is intended to be clocked at 200 MHz. The 1-phase system was chosen since the clocking period is very short and the logic is often hard to divide into two equally delayed parts. Of course, time sharing between phases could have been used in a 2-phase system but would have required advanced clocking analyses. Our strategy facilitates the logic design work, but the timing restrictions of the registers are a bit more complex because write signals to the 2-phase latches have to be stable at the second phase. Another drawback is that the two phases are not loaded equally. This increases the risk of some clock-skew but modern technologies has a well working clock tree architecture that often solves these problems.

The instructions in the i/o processor architecture are chosen to be 24-bit words in order to hold general instruction coding plus general instruction coding.

The instruction memory is preferably implemented as an on-chip RAM memory. The size may be up to 2048 words.

To support one of the RS-232, IEEE-1284 or ATA protocols the total size needed is less than 512 words. The timing of the RAM 3 has to fit into one cycle e.g. less than 5 ns. The RAM 3 can be loaded serially by the CPU 2 or by defining necessary pins in the architecture to be both RAM programming and general i/o pins.

Figure 12:
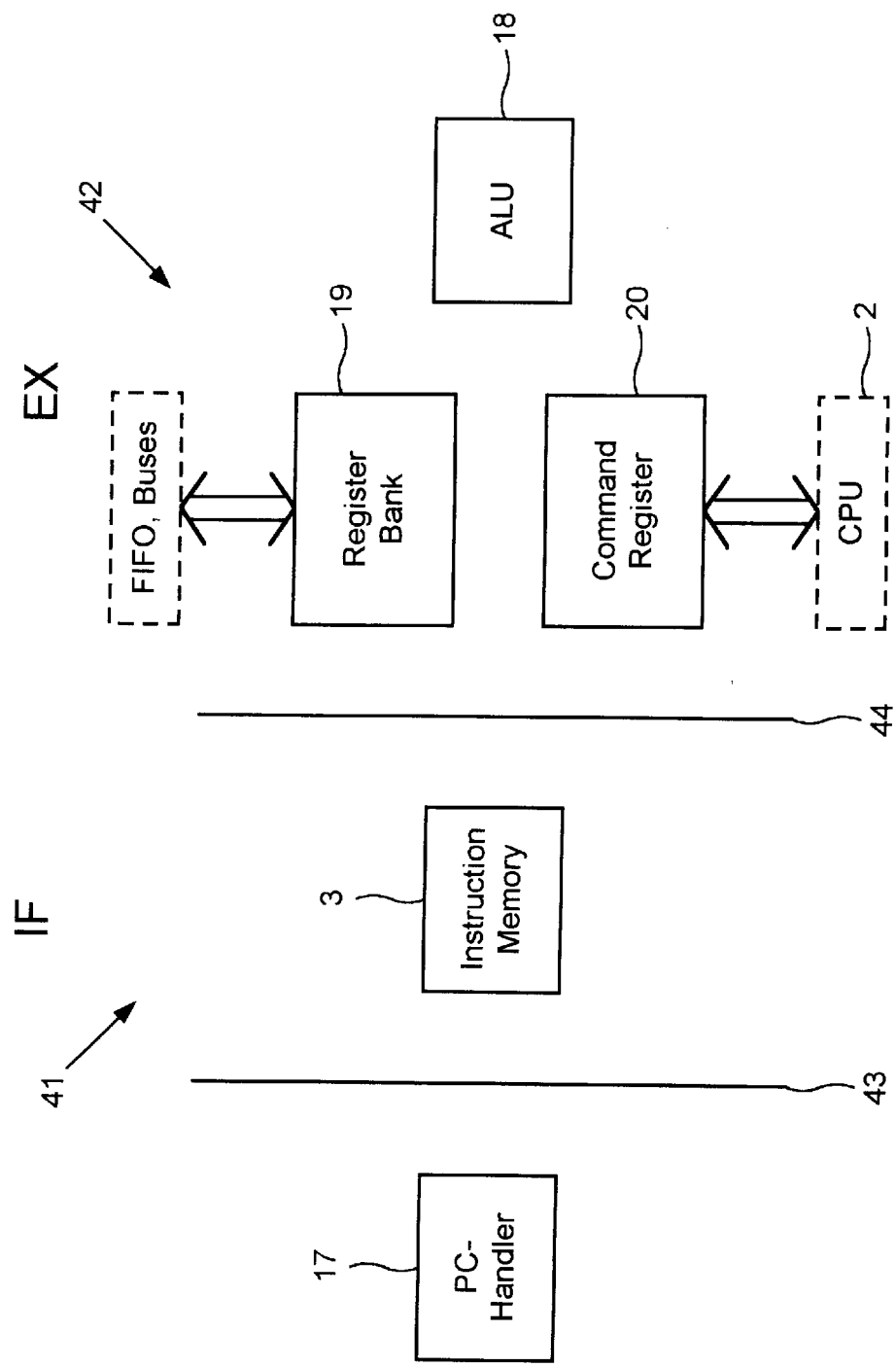
FIG. 12 is an embodiment of the i/o-processor pipeline steps (IF and EX)

The i/o-processor core 12 is implemented as a two step pipeline, illustrated in FIG. 12. The first step is the IF (Instruction Fetch) step (or stage) 41, where the instructions are read in from the internal RAM 3. The second and last step is the EX (Execution) step (or stage) 42 where operands are fetched and executed in the ALU 18. All functions like pin access, FIFO access are also positioned in this second step 42.

Figure 13:
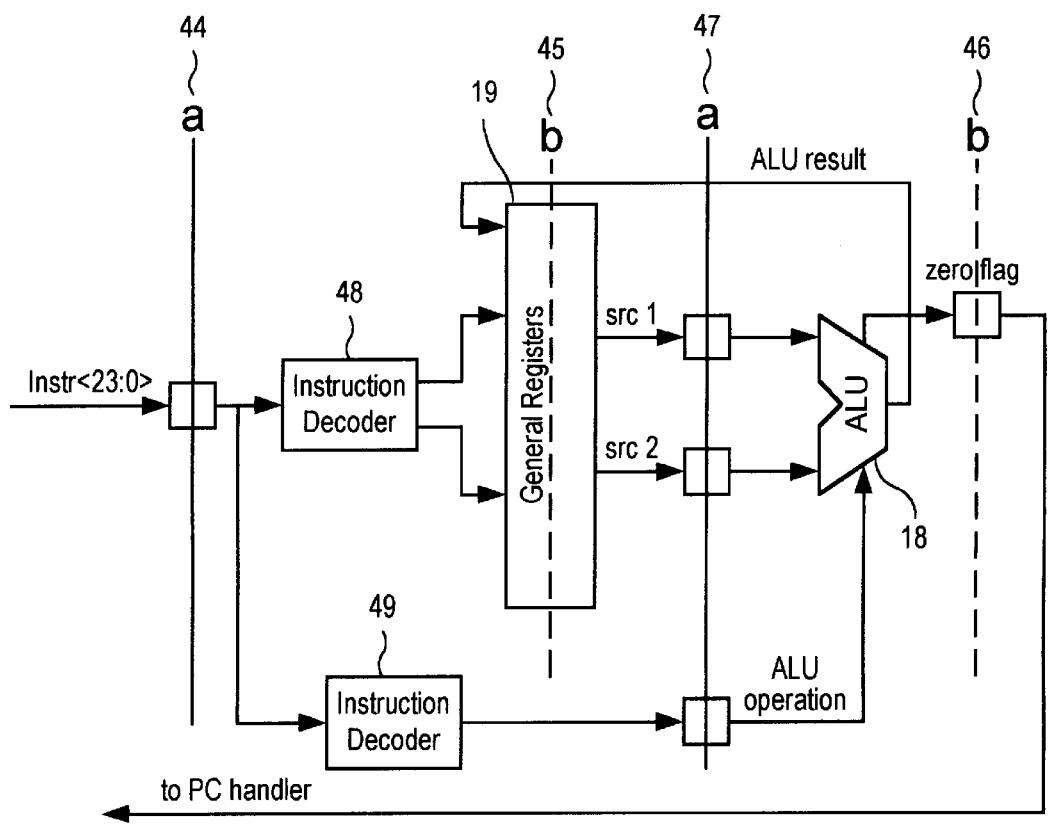
FIG. 13 shows the different phases in the EX-step.

The instruction memory is located between two a-phase flip-flops 43, 44. The EX-step 42 is a bit special since the general registers are implemented as b-latches to save area. FIG. 13 illustrates the different phases in the EXstep 42.

The execution is located between two b-phases 45,46, e.g. the register bank 19 and the flag registers, and divided by an a-phase 47 (latches). The registers are updated 1.5 cycles after the IF-step 41, which is allowed since the registers 19 are not accessed until 0.5 cycle after the IF-step 41. The instructions pass a first and second instruction decoder 48,49 in the EX-step 42 in order to control the different components of the EX-step 42.

Branch decisions are taken in the second phase of the EX-step. This is one of the most time critical parts of the i/o-processor core 12. The PC handler logic 17 to decide whether a branch is to be taken or not and select the proper PC in less than 2.5 ns.

Figure 14:
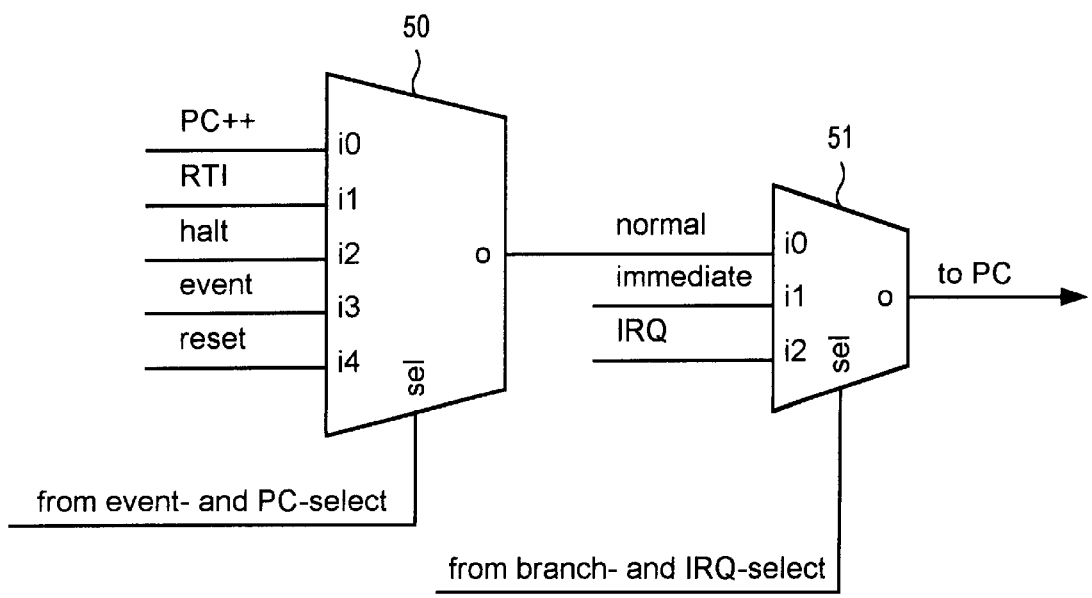
FIG. 14 shows the steps for selection of a proper PC (program counter) in the PC handler.

The PC Handler 17 is divided in two different parts. A first PC Handler part is controlling the PC and branches and a second PC Handler part is the interrupt- and event-handler. The interrupt- and event-address registers are implemented as b-latches, again to save some precious area. The logic that handles the priority between interrupts and events is quite complex but hidden in BDS code. The IRP (Interrupt Return Pointer) is an 11-bit flip-flop and included in the PC Handler 17. The selection of the PC is divided in two steps 50 and 51, illustrated in FIG. 14, to ensure that the timing demands will be fulfilled.

The immediate- and the interrupt-addresses (IRQ) have to be selected by an own multiplexor 51. These are the most time critical signals. The PC++ signal is the incremented PC and is selected as default at normal instructions. The RTI instruction selects the IRP address at the first multiplexor 50 and the normal at the second. The halt address is simply the same PC as in the last cycle. When an event occurs the select logic selects the event address. The design may be reset to any address, sent via the command register from the CPU.

The register bank is implemented by b-latches to save area. Each 16-bit register is divided in two separate 8-bit registers. This allows the instructions to write back the result to the lower 8-bit field without affecting the upper 8-bit field of a register. All external register sources are directly available as registers according to Table 8. The right FIFO data and external bus data are selected by external 4×16 multiplexors.

TABLE 8

| Register # | Source |
|---|---|
| 10 | immediate |
| 11 | FIFO data |
| 12 | FIFO status |

TABLE 8-continued

| Register # | Source |
| --- | --- |
| 13 | external bus data |
| 14 | command register |
| 15 | pin vector |

The ALU is implemented as both BDS code and manually designed logic. The result must be calculated in 2.5 ns, but this is not the major problem. The update of the Z-flag is the most critical path. It was not possible to build an incrementer or decrementer and afterwards check if the produced result should result in a Z-flag. The solution is to check if the operand to be incremented (or decremented) is equal to 0xffffffff (or 0x00000001 for the decrement operation). These values should result in a set Z-flag and the test is simply an 8-bit AND gate plus inverters. This is a much quicker test than the increment plus compare operations.

The final implementation of the i/o processor 2 contains 8 timers. The timers are built as separate blocks, shown in FIG. 6. The time'r blocks include the two registers in each timer, the registers are implemented as flip-flops. A timer is implemented between two a-phases. The timers event and interrupt signals are connected to the PC-Handler. If the timer is set to sample a bit the sampled result is stored in a flip-flop. This flip-flop could be read by the instruction RTB (Read Timer Buffer). The pin selected by the timer extended register is connected to the pin register in the register bank 19, but also to the mask register 21. Table 9 shows the pins in the pin vector 22.

There are 6 Pin Controllers 29 in the i/o-processor implementation. Like the timers the controllers are built as separate blocks, between two a-phases. The controller includes the controller register, which is implemented with flip-flops. A description over a controller is illustrated in FIG. 7. The pin selected in the controller is included in the pin vector in the register bank, see Table 9.

TABLE 9

| Pin register bit | Source | Pin register bit | Source |
| --- | --- | --- | --- |
| 0 | Timer 0 | 8 | Controller 0 |
| 1 | Timer 1 | 9 | Controller 1 |
| 2 | Timer 2 | 10 | Controller 2 |
| 3 | Timer 3 | 11 | Controller 3 |
| 4 | Timer 4 | 12 | Controller 4 |
| 5 | Timer 5 | 13 | Controller 5 |
| 6 | Timer 6 | | |
| 7 | Timer 7 | | |

Figure 15:
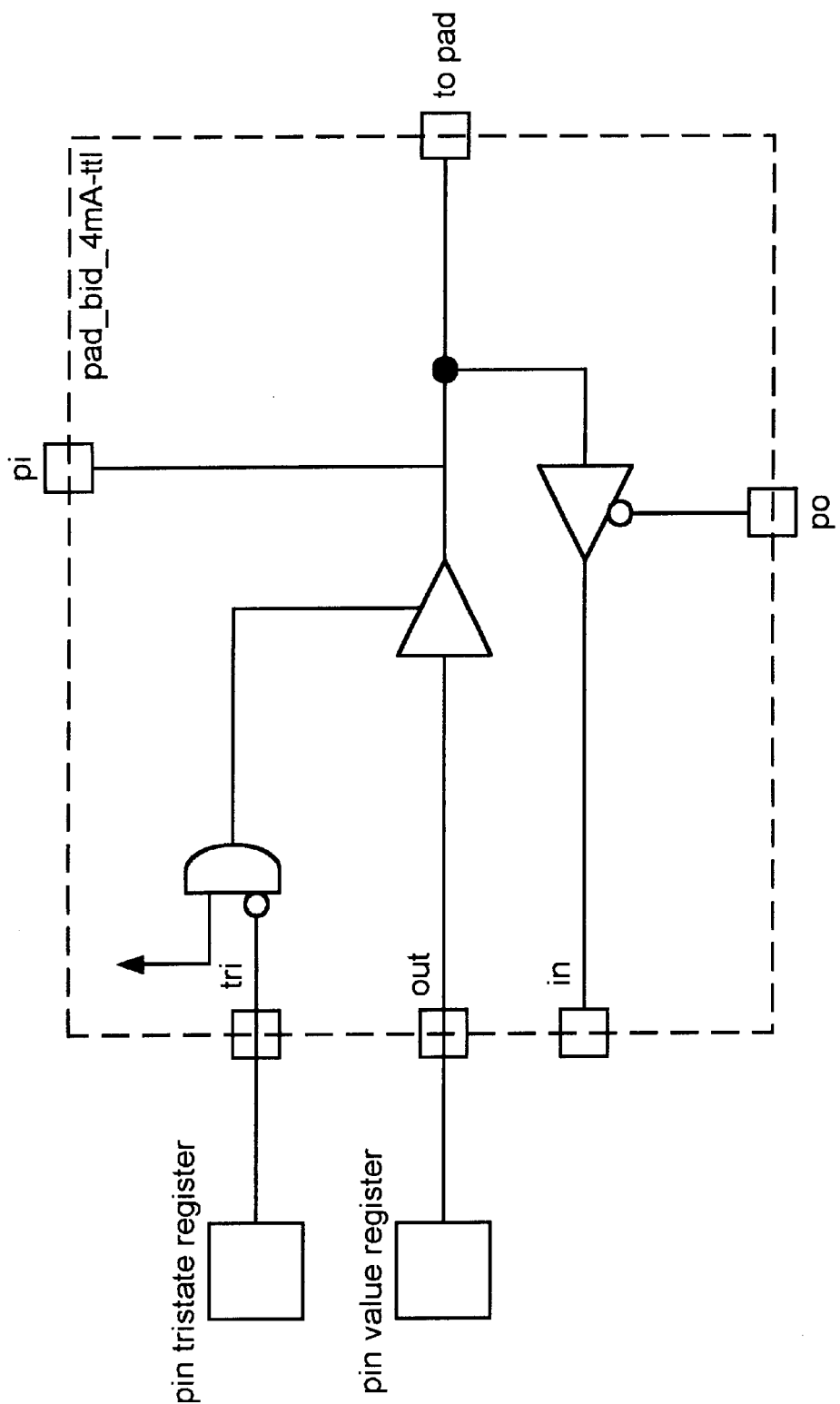
FIG. 15 is a schematical block diagram of pin tristate and value registers.

All pins and buses may be tristated individually. Tristate data and pin values are stored in special registers like in FIG. 15.

A zero in the tristate register makes the pin work as an output and a one as an input. It should be apparent that the present invention provides an improved inputoutput control system, supporting different protocols. Although the invention has been described in conjunction with a specific embodiment thereof, this invention is susceptible of embodiments in different forms, with the understanding that the present disclosure is to be considered as an exemplification of the principles of the invention and is not intended to limit the invention to the specific embodiment illustrated.

What is claimed is:

1. An on-chip i/o-processor for controlling and communication with peripheral devices, characterized by an i/o-processor core (12), comprising at least one pin controller (29) for reading and setting physical i/o-pins (6), starting timers and generating interrupts for the i/o-processor core (12), at least one timer (26) for sampling i/o-pins (6), setting i/o-pins (6) and generating interrupts for the i/o-processor core (12) at well defined points of time, said i/o-processor core (12) providing instructions for controlling said at least one pin controller (29), said at least one timer (26) and i/o-pins (6), an on chip RAM (3) holding instructions for the i/o-processor core (12), at least one register (4) for exchanging information between the i/o-processor (2) and a connected CPU (1) on the same chip and inversely, configurable logic (5), connected between said core (12) and said i/o-pins (6), for synchronization of incoming and/or outgoing signals.

2. An on-chip i/o-processor according to claim 1, characterized in that said configurable logic further comprises pin selecting means (30) connected to pin level comparing means (31), for generating events (33), interrupts (32) or timer start signals (34) (FIG. 7).

3. An on chip i/o processor according to claim 1, characterized by 32 i/o pins connected to said configurable logic, and two 8-bit buses and two 16-bit buses connected to the core and FIFOs.

4. An on-chip i/o-processor according to claim 3 characterized by an i/o-processor architecture 35 enabling fast data transfer by allowing direct transfers between the buses (36, 37) and the FIFOs (11) (FIG. 9).

5. An on-chip i/o processor according to claim 1, wherein RS-232, IEEE-1284, ATA, and SCSI protocols are supported.

6. An on-chip i/o-processor according to claim 1, characterized in that the i/o-processor has 8-bit pin mask registers, and these registers are used together with pin select registers, wherein the mask registers are used to select a combination of pins, by means of an AND-gate, which are compared, by means of a comparison component, with 8-bit pin mask compare registers, enabling the i/o-processor to wait for a combination of several signals and then generate an event.

7. An on-chip i/o-processor according to claim 1, characterized in that the i/o-processor core is a two step pipeline, wherein the first step is an IF step, wherein the instructions are read in from the internal RAM, and the second step is an EX step, wherein operands are fetched and executed in the ALU.

8. A method for controlling peripheral devices using the i/o-processor according to claim 5, characterized in that a receiving procedure of RS-232 signals comprise the steps of:

loading a timer with the number of i/o processor cycles, and a value in order to sample an RS-232, RxD signal;

storing said sampled value of the RxD signal in a special 1 bit wide register, readable in an interrupt routine;

using an i/o-processor controller to sense for a start bit, wherein the controller will start the timer and generate an interrupt;

setting up a free register to store the byte being received;

loading the timer with the value equal to the length of one RS-232 bit;

sampling all data bits at the right time by the timer;

incrementing a counter to decide if the predetermined number of data bits has been received;

when all the data bits are received sampling the stop bit and then stop;

in the last interrupt routine putting the received byte in the FIFO for the CPU;

reloading the timer value; and starting the controller to sense for another start bit, indicating another byte to be received.

9. A method for controlling peripheral devices using the i/o-processor according to claim 5, characterized in that a negotiation from Compatibility mode to Nibble mode in the IEEE-1284 protocol comprises the steps of:

putting 0000 0000 at the data bus;

loading a timer to wait for Tp seconds;

setting nSelectin high and nAutoFd low;

sensing the pins PError, nAck, nFault and Select for the response signature for IEEE-1284;

starting a timer to count for a time-out if the peripheral does not respond;

if the peripheral responds correctly, pulsing the nStrobe signal;

stopping the timer counting for time-out; and waiting for nAck to go high, indicating that the peripheral has accepted the requested mode.

* * * * *